(12) United States Patent
Maruko

(10) Patent No.: US 6,506,359 B1
(45) Date of Patent: Jan. 14, 2003

(54) AUTO-OXIDATION AND INTERNAL HEATING TYPE REFORMING METHOD AND APPARATUS FOR HYDROGEN PRODUCTION

(75) Inventor: Saburo Maruko, Yamato (JP)

(73) Assignee: Nippon Chemical Plant Consultant Co., Ltd., Tokyo (JP)

( * ) Notice: Subject to any disclaimer, the term of this patent is extended or adjusted under 35 U.S.C. 154(b) by 78 days.

(21) Appl. No.: 09/688,752

(22) Filed: Oct. 13, 2000

(30) Foreign Application Priority Data

Oct. 20, 1999 (JP) .......................................... 11-297945
Mar. 3, 2000 (JP) ...................................... 2000-058483

(51) Int. Cl.⁷ .............................. C01B 3/02; C01B 3/26; C01B 3/16
(52) U.S. Cl. ..................... 423/648.1; 423/652; 423/656
(58) Field of Search .............................. 423/648.1, 652, 423/656

(56) References Cited

U.S. PATENT DOCUMENTS

| | | | | |
|---|---|---|---|---|
| 5,030,440 A | * | 7/1991 | Lywood et al. | ............. 423/655 |
| 5,112,578 A | | 5/1992 | Murayama et al. | |
| 5,741,474 A | * | 4/1998 | Isomura et al. | .......... 423/648.1 |
| 6,331,283 B1 | * | 12/2001 | Roy et al. | ................. 423/648.1 |

FOREIGN PATENT DOCUMENTS

| | | |
|---|---|---|
| DE | 4423587 A1 | 1/1996 |
| JP | 7-33401 A | 2/1995 |
| JP | 9-315801 A | 12/1997 |
| WO | WO 96/00186 A | 1/1996 |
| WO | WO 98/08771 A2 | 3/1998 |
| WO | WO 99/48805 A1 | 9/1999 |

OTHER PUBLICATIONS

Taki M et al: "High Efficient and Compact Methanol Reformer for Fuel Cells", Toyota Technical Review, Toyota, JP, vol. 47, No. 2, Nov. 1997, pp. 76–81, XP002926587.
Patent Abstracts of Japan, vol. 012, No. 382 (C–535), Oct. 12, 1988 of JP 63 129002 A (Hitachi Ltd) Jun. 1, 1998.
Patent Abstracts of Japan, vol. 1997, No. 03, Mar. 31, 1997 of JP 08 301601 A (Ishikawajima Harima Heavy Ind Co Ltd) Nov. 19, 1996.

* cited by examiner

Primary Examiner—Wayne A. Langel
(74) Attorney, Agent, or Firm—Frishauf, Holtz, Goodman & Chick, P.C.

(57) ABSTRACT

An auto-oxidation and internal heating type reforming method and apparatus for hydrogen production are disclosed for use in a process in which a gaseous mixture of a hydrocarbon or an aliphatic alcohol with water vapor is fed into contact with a mass of a reforming catalyst to bring about a reforming reaction of the gaseous mixture to produce hydrogen, wherein a small amount of an oxidizing catalyst is admixed with the reforming catalyst in that mass; and a small amount of oxygen is admixed with the gaseous mixture, whereby a portion of the hydrocarbon or aliphatic alcohol is exothermally oxidized to generate a quantity of heat required to reform the gaseous mixture of the hydrocarbon or aliphatic alcohol with water vapor.

17 Claims, 5 Drawing Sheets

AUTO-OXIDATION AND INTERNAL HEATING TYPE REFORMING METHOD AND APPARATUS FOR HYDROGEN PRODUCTION

TECHNICAL FIELD

The present invention relates to improvement in a method of and an apparatus for producing hydrogen by a reforming reaction. In particular, it relates to providing an auto-oxidation and internal heating type reforming method and apparatus for hydrogen production.

BACKGROUND ART

So far in producing hydrogen, a reforming method and apparatus using a reforming reaction has advantageously been adopted in which a mixture of a hydrocarbon or an aliphatic alcohol with water vapor is fed onto and contacted with a reforming catalyst. In such methods and apparatus, it is customary that a quantity of heat needed for the reforming reaction is provided externally via wall surfaces of the reforming reactor.

In such conventional methods and apparatus as described, the necessary amount of heat for the reforming reaction is supplied externally via the wall surfaces of the reforming reactor with a sensible heat of a combustion gas burnt outside of the reforming reactor or a sensible heat of a heating medium. It has therefore been necessary that an external combustion furnace or burner unit for heat supply or thermo-circulating unit for the heating medium or thermal catalyst be separately provided. As a result, the entire apparatus has had to be large in size and yet it has been difficult to obtain well satisfactory thermal efficiency. Also, in the case of hydrocarbons use, methane whose reforming reaction temperature is required for 700 to 750° C. is usually used. And if methane is heated externally to reach that temperature in the reforming reactor, the wall surfaces of the reforming reactor must be limited in temperature to 1000° C. or less, otherwise the material that makes up those wall surfaces tends to deteriorate, rendering the reforming reactor not usable over a long period of time and thus causing a difficulty in its workability.

DISCLOSURE OF INVENTION

The present invention is contrived to solve the foregoing problems and it is an object of the present invention to provide a reforming method for hydrogen production which makes a reforming reactor apparatus compact, which largely reduces energy cost needed for reforming, and which is capable of bringing development of NOx, an environmental pollutant, almost or unlimitedly to zero. It is also an object of the present invention to provide a reforming apparatus for carrying out such a method.

In order to achieve the objects mentioned above there is provided in accordance with the present invention in a first aspect thereof an auto-oxidation and internal heating type reforming method for hydrogen production for use in a process in which a gaseous mixture of a hydrocarbon or an aliphatic alcohol with water vapor is fed into contact with a mass of a reforming catalyst to bring about a reforming reaction of the gaseous mixture therewith to produce hydrogen, wherein the method comprises the steps of: admixing a small amount of an oxidizing catalyst with the said reforming catalyst in the said mass; and admixing a small amount of oxygen with the gaseous mixture of the hydrocarbon or aliphatic alcohol with water vapor, whereby a portion of the hydrocarbon or aliphatic alcohol is exothermally oxidized to generate an amount of heat required to reform the gaseous mixture of the hydrocarbon or aliphatic alcohol with water vapor.

These and other features, objects and advantages of the present invention will become more readily apparent to those of ordinary skill in the art from the following detailed description of the preferred forms of embodiment thereof as illustrated in the various drawing Figures.

BRIEF DESCRIPTION OF DRAWINGS

In the accompanying drawings.

BEST MODES FOR CARRYING OUT THE INVENTION

Figure 1:
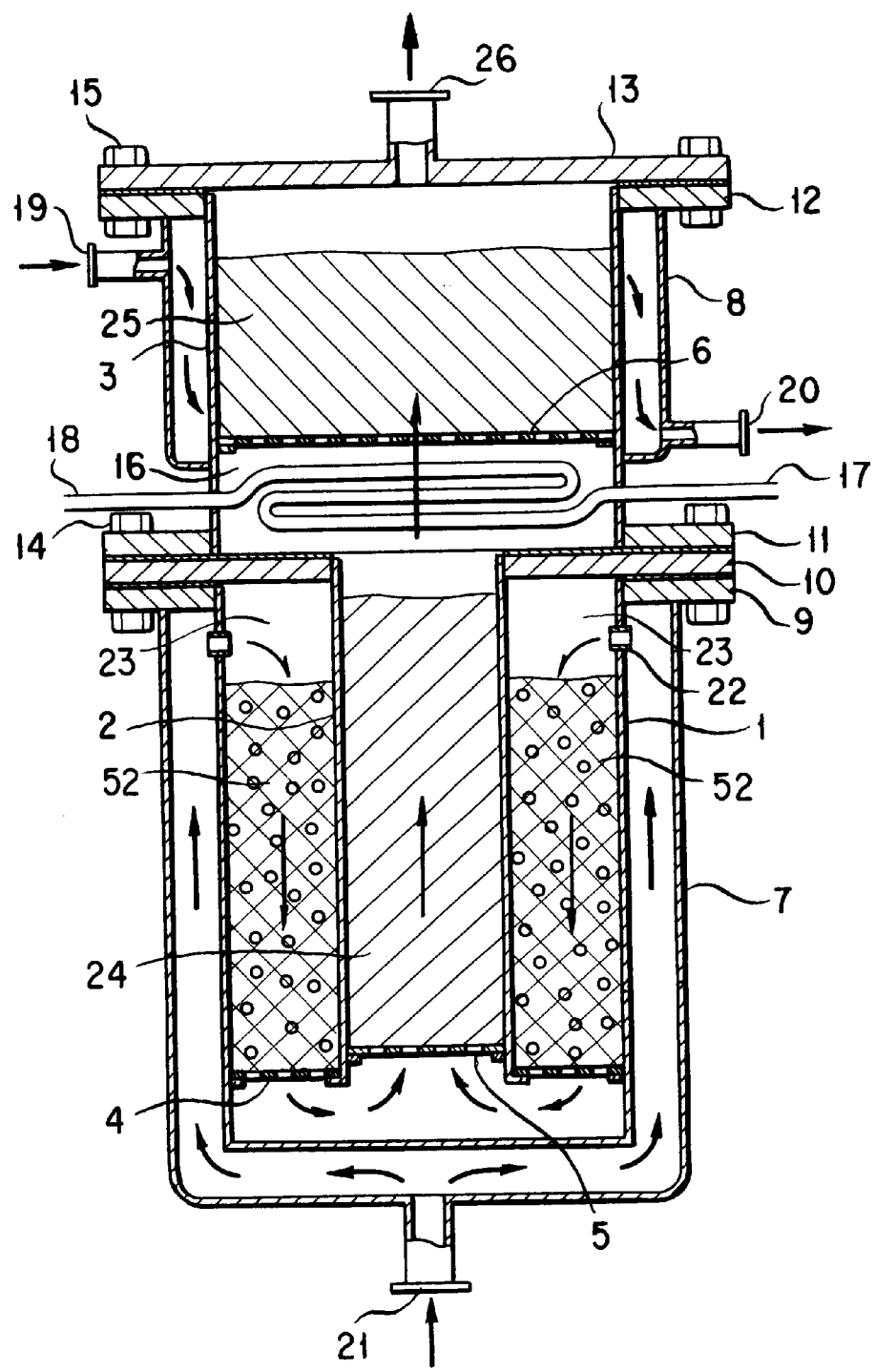
FIG. 1 is a cross sectional view in elevation illustrating a reforming apparatus for use in carrying out a method according to the present invention, and as implemented in a first form of embodiment thereof.

Research and investigations by the present inventor have revealed that feeding a bed or layer of a reforming reaction catalyst with a gaseous mixture a hydrocarbon or an aliphatic alcohol with water vapor, if the gaseous mixture has a small amount of oxygen added thereto and the catalytic layer has a small amount of an oxidizing catalyst added thereto, permits a portion of the hydrocarbon or aliphatic alcohol to be exothermally oxidized and to internally derive an amount of heat as required to reform the hydrocarbon or aliphatic alcohol.

In this case, a small amount of oxygen may be added to the gaseous mixture of a hydrocarbon or aliphatic alcohol with water vapor either in advance or after the gaseous mixture on contacting with the reforming catalyst is in part reformed. Alternatively, a portion of the small amount of oxygen may be added to the gaseous mixture of a hydrocarbon or aliphatic alcohol with water vapor in advance, and a reminder the small amount of oxygen may be added after the resultant gaseous mixture on contacting with the reforming catalyst is part reformed.

By the way, a large difference exists between a hydrocarbon and an aliphatic alcohol in the amount of an oxidizing catalyst used, because of a difference in temperature between their respective reforming reactions as required.

Thus, a hydrocarbon in order for its reforming reaction to be accomplished requires a temperature of 700 to 750° C. In the conventional external heating reformer, a hydrocarbon commences its reforming reaction when its gaseous mixture with water vapor is externally heated to a temperature around 500° C., the reforming reaction coming to an end substantially when the temperature of the reforming reaction is raised up to 700 to 750° C.

Since the reforming reaction is an endothermic reaction, it is important that an amount of heat commensurate with the heat absorbed be replenished enough so that the reaction temperature may not fall but be maintained in the reforming reaction catalyst.

According to the method of the present invention, an exothermic oxidizing reaction that is caused to occur inside of the catalyst bed or layer has been found to produce a sensible heat which is sufficient to maintain the temperature substantially in a range between 700° C. and 800° C. and thus is capable of maintaining a temperature as required for the reforming reaction. To wit, if low temperature hydrogen produced by the reforming reaction brings about a temperature drop in the gaseous mixture of its raw material hydrocarbon with water vapor, oxygen that remains in the gaseous mixture will react with the hydrocarbon again in the presence of the oxidizing catalyst in the catalytic bed or layer to restore the gaseous mixture to a temperature of about 800° C., thus continuing the reforming reaction repetitively. In this way, the method of the present invention, by giving rise to a state such as if a multi-stage fine catalytic combustion took place in a catalytic layer, is found to largely reduce even the amount of a reforming reaction catalyst and to make it possible to reduce the size of the apparatus as well. An amount of an oxidizing catalyst that ranges between 1 and 10% of a reforming reaction catalyst (e. g., for methane, 3%±2%, namely in a range of 1 to 5%) has been found to be suitable for use. For an oxidizing catalyst use may be made of any catalyst that can withstand a temperature in this range, although use is typically made of platinum, palladium or the like as distributed in the reforming catalyst.

An aliphatic alcohol is markedly lower in reforming temperature than a hydrocarbon. Not only does its reforming reaction go on at a temperature as low as 250 to 350° C., but it absorbs less amount of heat for the reforming reaction, permitting the amount of oxygen being fed into a gaseous mixture of the aliphatic alcohol with water vapor to be considerably reduced. As a consequence, the reforming reactor can even more be reduced in size. For an aliphatic alcohol, an amount of an oxidizing catalyst that ranges between 1 and 5% of a reforming reaction catalyst has been found to be suitable for use (e.g., for methanol, 2%±1% is preferable).

For instance, if the reforming reaction catalyst has a space velocity SV of approximately 3,000 or so, an oxidizing catalyst having an SV of approximately 100,000 or so will achieve its purposes. Then, it is important that the oxidizing catalyst be dispersed and distributed enough evenly in the reforming reaction catalyst. Besides, to facilitate commencement of the reaction it has been found advantageous to dispose a thin layer of the oxidizing catalyst in front of the reforming reaction catalytic layer containing the oxidizing catalyst. Also, for concluding the reaction more quickly, it has been found that a thin layer of the oxidizing catalyst may advantageously be disposed behind the composite (mixed) reforming reaction catalytic layer.

A hydrocarbon or aliphatic alcohol fed into a reforming reaction catalytic bed or layer having an oxidizing catalyst admixed therein reacts with oxygen by the admixed oxidizing catalyst and is exothermally oxidized. A resultant gaseous mixture has its temperature elevated and, upon contacting with the reforming reaction catalyst, brings about a reforming reaction thereby to produce hydrogen. As mentioned before, the reforming reaction being an endothermic reaction causes the gaseous mixture to reduce in temperature, but the presence of the oxidizing catalyst in the reforming reaction catalytic bed or layer downstreams permits an unreacted portion of the hydrocarbon or aliphatic alcohol still further to react with such residual oxygen, thus generating heat that tends to maintain the temperature of the gaseous mixture substantially constant. In this way, the reforming reaction is allowed to continue in steps and in succession until the amount of oxygen in the gas fed may completely be consumed. In this case, dimensioning the thickness of the reforming reaction catalytic layer traversed by the gaseous mixture to be commensurate with the amount (rate) of feed of the gaseous mixture permits the reforming reaction to be concluded at the end of a way out of the reforming reaction catalytic bed or layer. From the standpoint of environmental control, it is desirable that the residual amount of oxygen be made completely nil by providing the exit end of the catalytic layer with a thin layer made up only of the oxidizing catalyst.

The ranges of SV suitable for the reactions in the present invention have been found to lie in 1,500 to 8,000 for a hydrocarbon and 2,000 to 8,000 for an aliphatic alcohol.

In the case of hydrocarbons as a raw material in the present invention, methane ($CH_4$), ethane ($C_2H_6$), propane ($C_3H_8$), kerosene, gasoline and so forth can be used, and typically methane ($CH_4$) is used. Then, the reforming reaction generally proceeds at a temperature of 750 to 800° C. For aliphatic alcohol for use in the present invention, use may be made of methanol, ethanol and so forth, and typically used is methanol. Then, the reforming reaction is carried out usually at a temperature of 250 to 350° C.

The proportion of water vapor to a hydrocarbon: ($H_2O/C$) used typically ranges between 2.5 and 3.5. The proportion of water vapor to an aliphatic alcohol: ($H_2O/C$) used typically ranges between 2 and 3.

For a reforming reaction catalyst, use may be made of any one commonly used. Well often used may include NiS—$SiO_2.Al_2O_3$, $WS_2$—$SiO_2.Al_2O_3$ and NiS—$WS_2.SiO_2.Al_2O_3$.

Post-reforming gases include hydrogen, carbon dioxide, carbon monoxide and water vapor. To increase the hydrogen concentration, a shift reaction may be employed. As a shift catalyst, ordinarily $Fe_2O_3$ or $Fe_3O_4$ is used, but if the reaction temperature exceeds 700° C., it is desirable to use $Cr_2O_3$.

For an oxidizing catalyst, preference is given of platinum (Pt) or palladium (Pd) which is resistant to a deleterious change at an elevated temperature.

For oxygen to be added, preference is given of pure oxygen. For pure oxygen, use is made of oxygen produced from a water electrolytic cell or bath that concurrently produces hydrogen which is advantageously used here as admixed with hydrogen obtained from the reforming reactor apparatus in the present invention. Noting that a water electrolytic bath or cell has an efficiency nowadays increased up to 80 to 90%, this combination is found to be industrially valuable. In economical view point, it might be possible to use air as a necessary oxygen resource. However, use of air reduces the concentration of hydrogen obtained by the reforming reaction. Thus, if air is used, it is desirable that an oxygen separation membrane be employed to increase the oxygen concentration in such air for feeding in the present invention.

Also, if air is used in reforming a gaseous mixture of a hydrocarbon with water vapor, such air should desirably have its operating pressure raised to 6 kg/cm$^2$ to 8 kg/cm$^2$. Then, the reforming reaction temperature may also be raised from the aforementioned range of 700 to 750° C. further to a range of 800 to 900° C.

This is because of the fact that if air is so used, it is necessary to later remove nitrogen ($N_2$) from a reaction gas in order to raise its hydrogen concentration. This is attained by cooling the reaction gas after both the reforming and shift reactions to a temperature around 55° C. and passing it through a hollow-fiber type separator membrane apparatus using, e.g., polysulfone. In this case, since the operating pressure for the reforming reaction to be raised in the range of 6 to 8 $kg/cm^2$, the reforming reaction temperature inevitably should be raised from the normal range of 700 to 750° C. to a higher range of 800 to 900° C.

If an oxygen-enriched air which oxygen concentration was raised by using the membrane-type separator apparatus, and an assumption is made that air is supplied under its pressure ranging between 8.4 $kg/cm^2$ and 9.0 $kg/cm^2$, and that the yield of oxygen is to be 90%, the resulted oxygen will have a concentration of 30 to 33%. And if the yield of oxygen is 70%, the resulted oxygen will have a concentration of 60 to 63%. Operating conditions may be selected from these ranges depending on an oxygen concentration as required.

An explanation of the present invention is shown as below, specifically in respect of two forms of embodiment thereof. It should be noted, however, that these forms of embodiment are illustrative and not intended to limit the present invention thereto.

First Form of Embodiment

Figure 2:
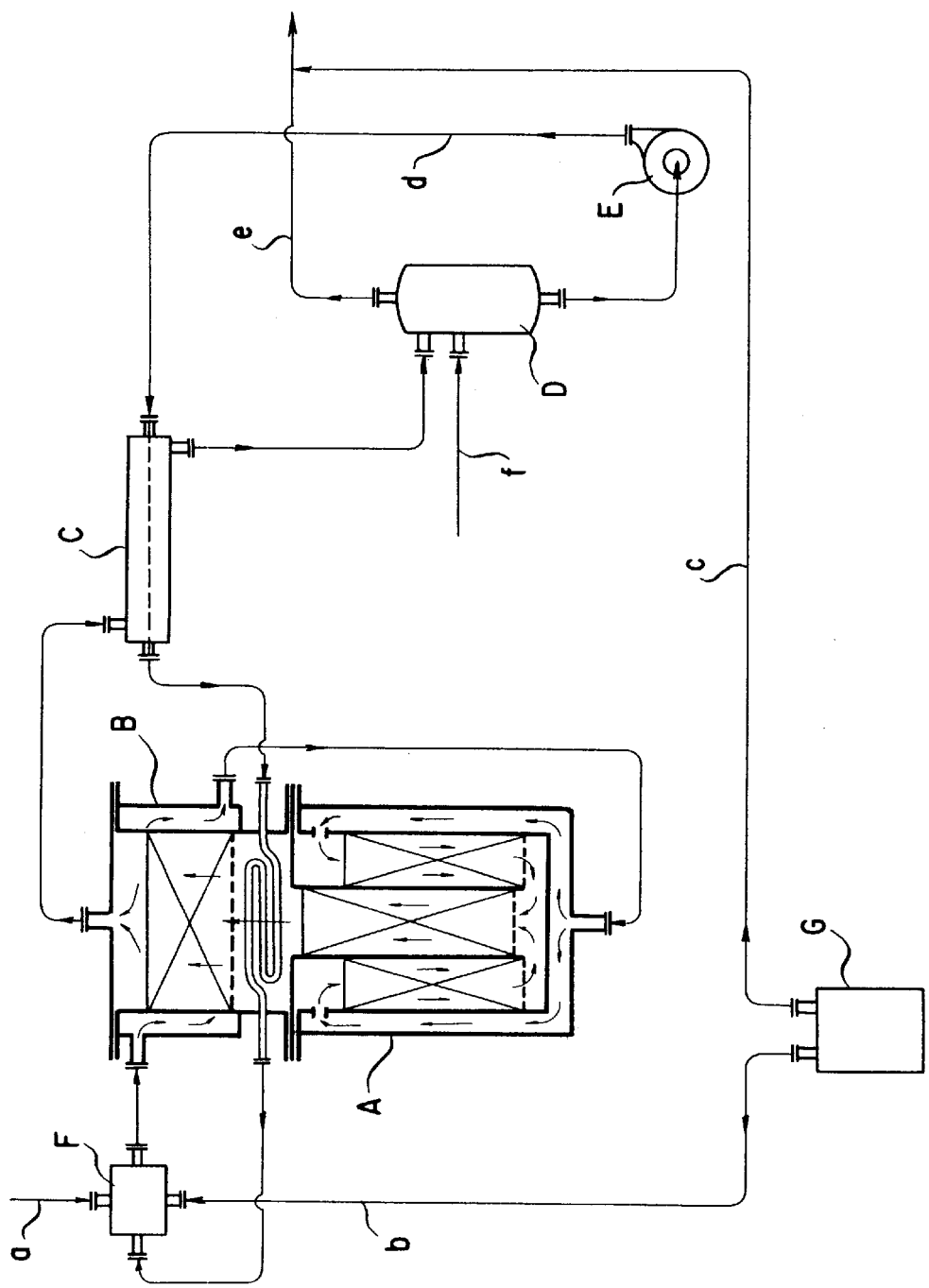
FIG. 2 is a diagrammatic view illustrating the reforming apparatus in the first form of embodiment of the invention shown in FIG. 1 and its related peripheral equipment.

Mention is made of the first form of embodiment of the present invention with reference to FIGS. 1 and 2. This form of embodiment of the invention is characterized in that a gaseous mixture of a hydrocarbon or aliphatic alcohol, with water vapor has oxygen added therein and admixed therewith in advance.

Mention is first made of a reforming reactor apparatus for practicing this form of the invention.

The reforming reactor apparatus includes a reforming reactor's outer cylinder 1 closed at bottom and a reforming reactor's inner cylinder 2 which define a space therewith, in which space a mixture 52 of a reforming reaction catalyst with a small amount of an oxidizing catalyst is loaded or packed in bed. The space has its lower end provided with a reforming reaction catalyst supporting lattice 4 as shown. A gaseous mixture having undergone a reforming reaction is allowed to pass through the lattice 4 and then pass a lower space to flow through an inner flow passage loaded with a high temperature shift catalyst 24, during which it is subjected to a shift reaction. The shift reaction is a reaction by which a mixture of carbon monoxide and water vapor is converted into hydrogen and carbon-dioxide gases and, it being an exothermic reaction, an amount of heat then produced acts to heat, via an outer wall 2 of the inner flow passage, an outer pack bed or catalytic layer of the reforming reaction catalyst and oxidizing catalyst mixture 52, namely, is fed into the latter. Using such a construction makes it possible, with heat generation anticipated, to reduce the amount of oxygen being added to the gaseous mixture of hydrocarbon or aliphatic alcohol with water vapor.

A further explanation in detail is given below along the gas flow in respect of the first form of embodiment shown in FIGS. 1 and 2.

A feed gas consisting of the gaseous mixture of hydrocarbon or aliphatic alcohol with water vapor and a small amount of oxygen added thereto and admixed therewith is fed through a reforming gaseous mixture pre-heater inlet 19 and, then flowing inside of a low temperature shift reactor jacket 8, is allowed to flow out through a reforming gaseous mixture pre-heater outlet 20. The feed gas then flows through a reforming gaseous mixture inlet 21 into a reforming reactor outer cylinder jacket 7. The feed gas while flowing through the low temperature shift reactor jacket 8 and the reforming reactor apparatus outer cylinder jacket 7 is pre-heated and then entering a reforming reactor cylinder or annular space 23 loaded with a reforming reaction catalyst and oxidizing catalyst mixture 52, undergoes a reforming reaction while in contact with the catalyst.

A gaseous mixture produced in the reforming reaction is passed thorough the reforming reaction catalyst supporting lattice 4, and then through a high temperature shift catalyst supporting lattice 5, and finally flowing into a high temperature shift catalyst loaded cylinder 24. With the layer of the reforming reaction catalyst and oxidizing catalyst mixture 52 in the reforming reaction cylinder or annular space 23 having a small amount of the oxidizing catalyst admixed therewith in dispersion, the gaseous mixture is raised in temperature with a heat generated by a multi-step oxidizing reaction that it undergoes when it passes through the layer, and thus permits the reforming reaction to continues in succession. A reaction gas having undergone the reforming reaction is reduced in temperature on exchanging heat in the lower space of the reforming reactor apparatus with the reforming gaseous mixture flowing through the outer cylinder jacket 7 of the reforming reactor apparatus and flows into the high temperature shift catalyst cylinder 24. A heat is generated by a shift reaction in the high temperature shift catalyst cylinder 24 and is transferred into the reforming reaction cylinder or annular space 23 though an inner wall thereof, thus serving to reduce the temperature drop there by the endothermic reaction. As a result, it is made possible to reduce the amount of oxygen being added to the gaseous of hydrocarbon or aliphatic alcohol with water vapor. Since the shift reaction is generally insufficient by a high temperature shift reaction, in practice a low temperature shift reaction is additionally carried out. Also, since a reaction gas leaving the high temperature shift reaction is raised significantly in temperature, it is desirable to cool the same in an heat-exchanging arrangement such that as shown in FIG. 2, water raised in temperature by exchanging heat in a water cooler C is made to flow through a gas cooler medium inlet 17 into a high temperature shift reaction cylinder outlet cooler 16. The cooled reaction gas is passed through a low temperature shift catalyst layer or bed 25 to conclude the shift reaction and is taken out of the system through a reformed gas outlet 26. An amount of water vapor produced by heat exchange in the cooler 16 is taken out through a gas cooler medium outlet 18 for use in the reforming gaseous mixture by mixing it with hydrocarbon or aliphatic alcohol and oxygen in a mixer F as shown in FIG. 2.

Second Form of Embodiment

Figure 3:
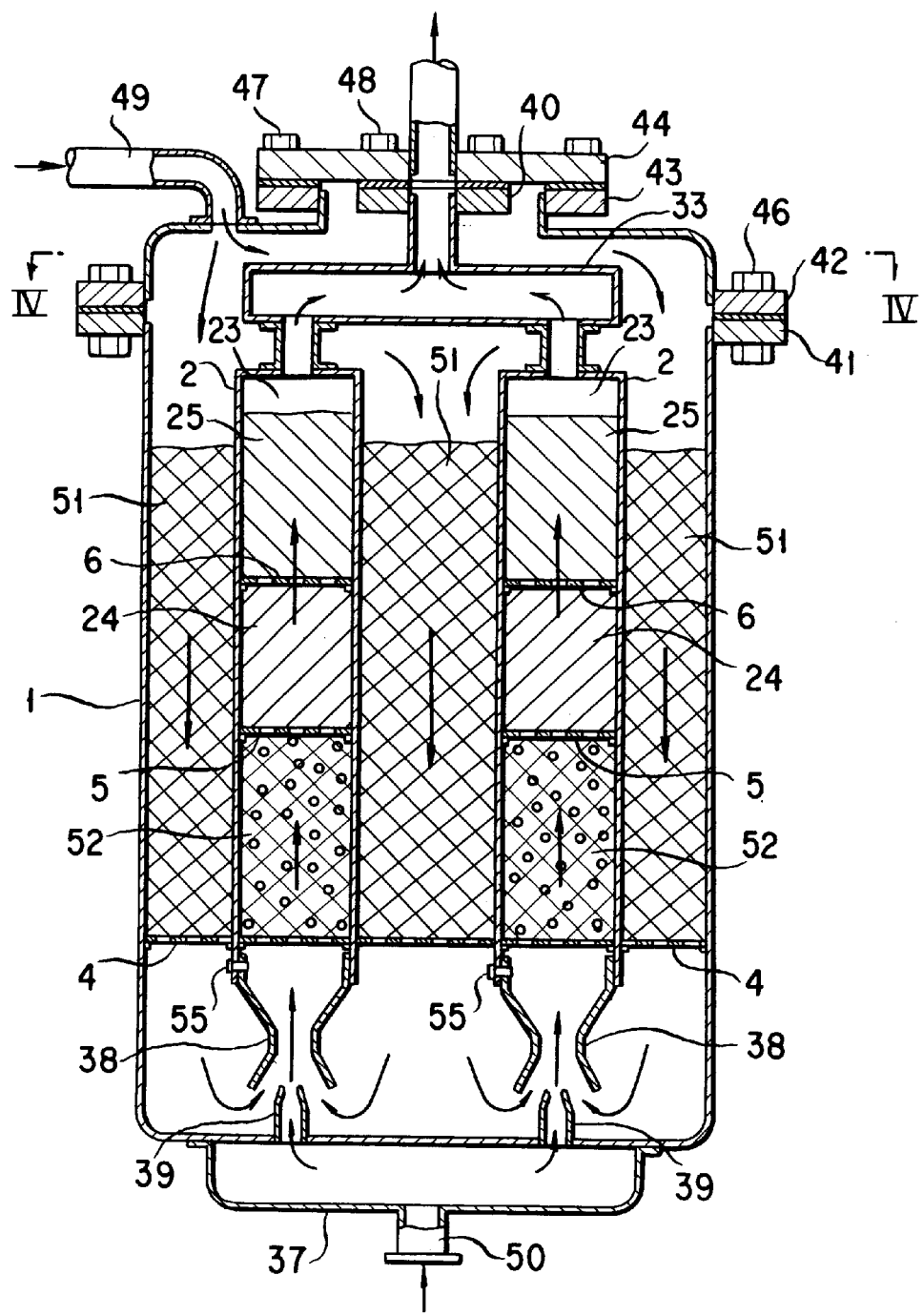
FIG. 3 is a cross sectional view in elevation illustrating a reforming apparatus for use in carrying out a method according to the present invention, and as implemented in a second form of embodiment thereof.
Figure 4:
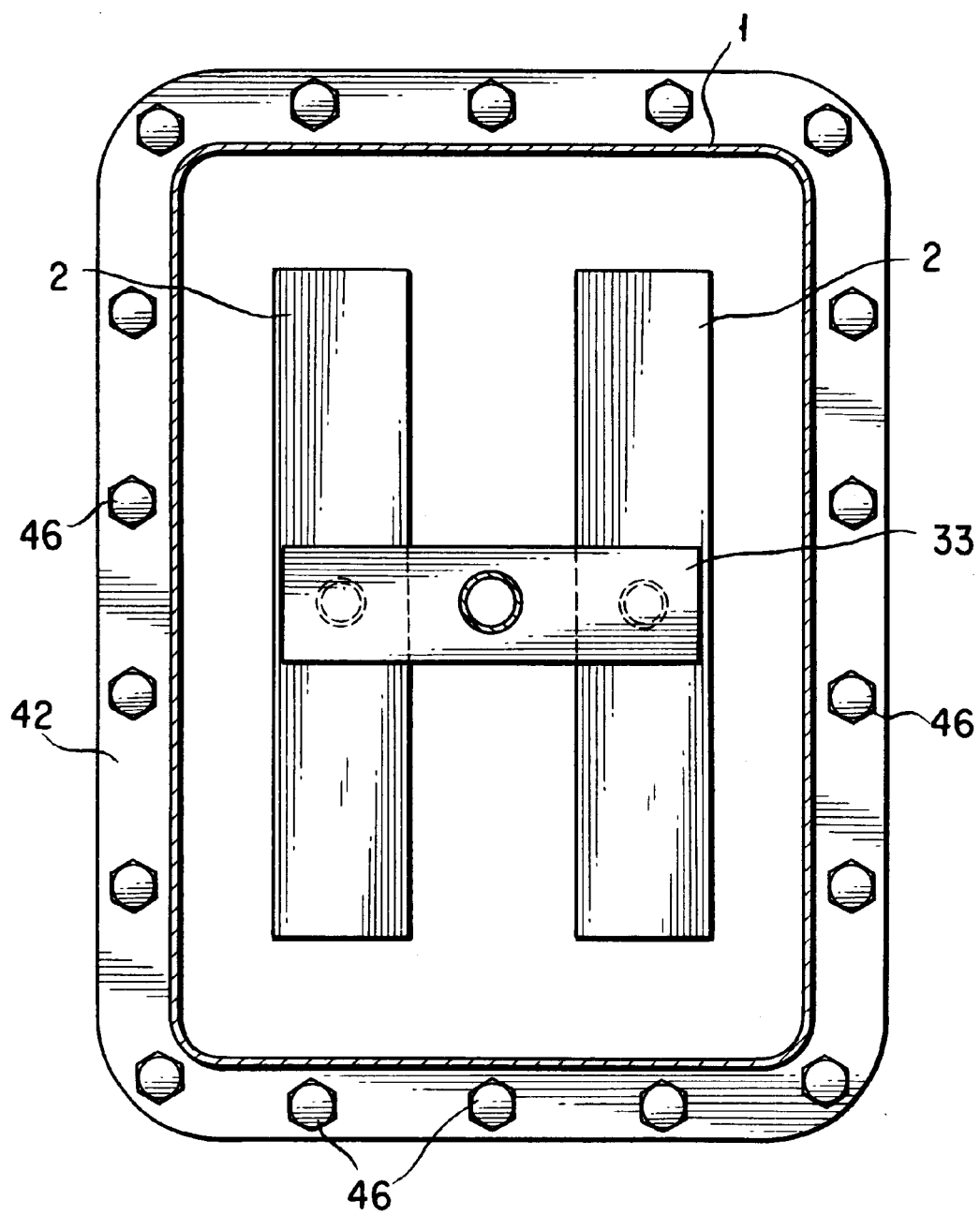
FIG. 4 is a cross sectional view taken along the line IV—IV as viewed from top in FIG. 3.

Mention is made of the second form of embodiment of the present invention with reference to FIGS. 3 and 4. This form of embodiment of the invention is characterized in that oxygen is added to a gaseous mixture of a hydrogen containing reformable reactant or composition, here constituted by a hydrocarbon or aliphatic alcohol, with water vapor, after the gaseous mixture is in part reformed.

Mention is first made of a reforming reactor apparatus for practicing this form of the invention.

The reforming reactor apparatus includes a reforming reactor's outer cylinder 1 basically closed at bottom and more than one reforming reactor's inner cylinders 2 which are disposed spaced apart from each other in the outer cylinder 1. The outer and inner cylinders 1 and 2 define a space therewith, in which space a reforming reaction catalyst 51 is loaded or packed in bed. The packed or loaded reforming reaction catalyst 51 is supported by a reforming reaction catalyst support or carrier 4, e. g., in the form of a lattice, disposed in the region of the lower ends of the reforming reactor's inner cylinder 2. Loaded or packed in each of the reforming reactor's inner cylinder 2 are, to say in the order from upstream to downstream of the gas flow, a reforming reaction catalyst and oxidizing catalyst mixture 52 containing a small amount of an oxidizing catalyst, a high temperature shift catalyst 24 and a low temperature shift catalyst 25 which are supported by the reforming reaction catalyst support 4, a high temperature shift catalyst support 5 and a low temperature shift catalyst support 6, respectively.

Disposed underneath each of the reforming reactor's inner cylinders 2 is a mixer 38 for adding oxygen into the reformable gaseous mixture. Each mixer 38 has an opening to which oxygen blowing nozzle 39 sits opposite. While as illustrated in FIG. 3 the mixer 38 is shown as attached to an inner wall of the reforming reactor's inner cylinder 2 by means of a mixer fastening pin 55, it should be noted that the mixer may be of any other form and may be attached in any other way.

As illustrated in FIG. 3, two elongate reforming reactor's inner cylinders 2 are shown as disposed left and right, each extending vertically, and are also shown as having a reforming gas collecting tube 33 disposed above them as can also be seen from the top plan view of FIG. 4. The reforming gas collecting tube 33 so disposed and arranged has at its top center a branch tube such that a reforming gas may be collected through it upwards.

A further explanation in detail is given below along the gas flow in respect of the second form of embodiment shown in FIGS. 3 and 4.

A gaseous mixture of hydrocarbon or aliphatic alcohol with water vapor is introduced through reforming gaseous mixture inlet pipe 49 and allowed to flow through the space defined by the reforming reactor's outer cylinder 1 and the reforming reactor's inner cylinders 2.

This space is loaded with the reforming reaction catalyst 51.

A reforming reaction caused by the reforming reaction catalyst and oxidizing reaction catalyst mixture 52 loaded in the inner cylinders 2 results in a high temperature gas whose heat is transferred via walls of the inner cylinders 2 into the reforming reaction catalyst 51 where a portion of the reformable gaseous mixture of hydrocarbon or aliphatic alcohol with water vapor is reformed.

The reformable gaseous mixture in part reformed and passed through the reforming catalyst support 4, then enters into the mixers 38 where it is admixed with oxygen or air from the oxygen or air blowing nozzles 39. The admixture then passes through the reforming catalyst support 4 and flows into the space loaded with the reforming reaction catalyst and oxidizing reaction catalyst mixture 52 in the inner cylinders 2.

In this space, the reformable gaseous admixture in part reformed is raised in temperature by the action of the oxidizing reaction catalyst to a target reaction termination temperature and is then reformed by the action of the reforming reaction catalyst, thus terminating the reforming reaction.

The temperature the fully reformed gas is high and a heat held in that gas is transferred through the walls of the inner cylinders 2 to the reformable gaseous mixture, i. e., to the reforming reaction catalyst 51 in the space between the reforming reactor's outer cylinder 1 and the reforming reactor's inner cylinders 2, thus reforming the reformable gaseous mixture in part.

The fully reformed gas is passed through the reforming reaction catalyst and high temperature shift catalyst support 5 enters the region of the high temperature shift catalyst 24 where it undergoes a shift reaction.

Heat generated in this reaction is transferred as in the preceding step though the walls of the reforming reactor's inner cylinders 2 to the reformable gaseous mixture where it is utilized to raise the temperature of the reformable gaseous mixture.

The regions whose temperatures are lower and insufficient to cause the reformable gaseous mixture to be reformed may be simply loaded with ceramic or the like particles in lieu of the reforming reaction catalyst.

Next, the fully reformed gas whose heat is transferred to the reformable gaseous mixture and thus which is lowered in temperature flows passed through the low temperature shift catalyst support 6 into the region loaded with the low temperature shift catalyst 25 where it completes the shift reaction.

The amount of heat that acts to lower any heat or sensible heat generated in the meantime is transferred via the walls of the reforming reactor's inner cylinders 2 to the reformable gaseous mixture for utilization to raise its temperature as well as have been mentioned.

Third Form of Embodiment

Figure 5:
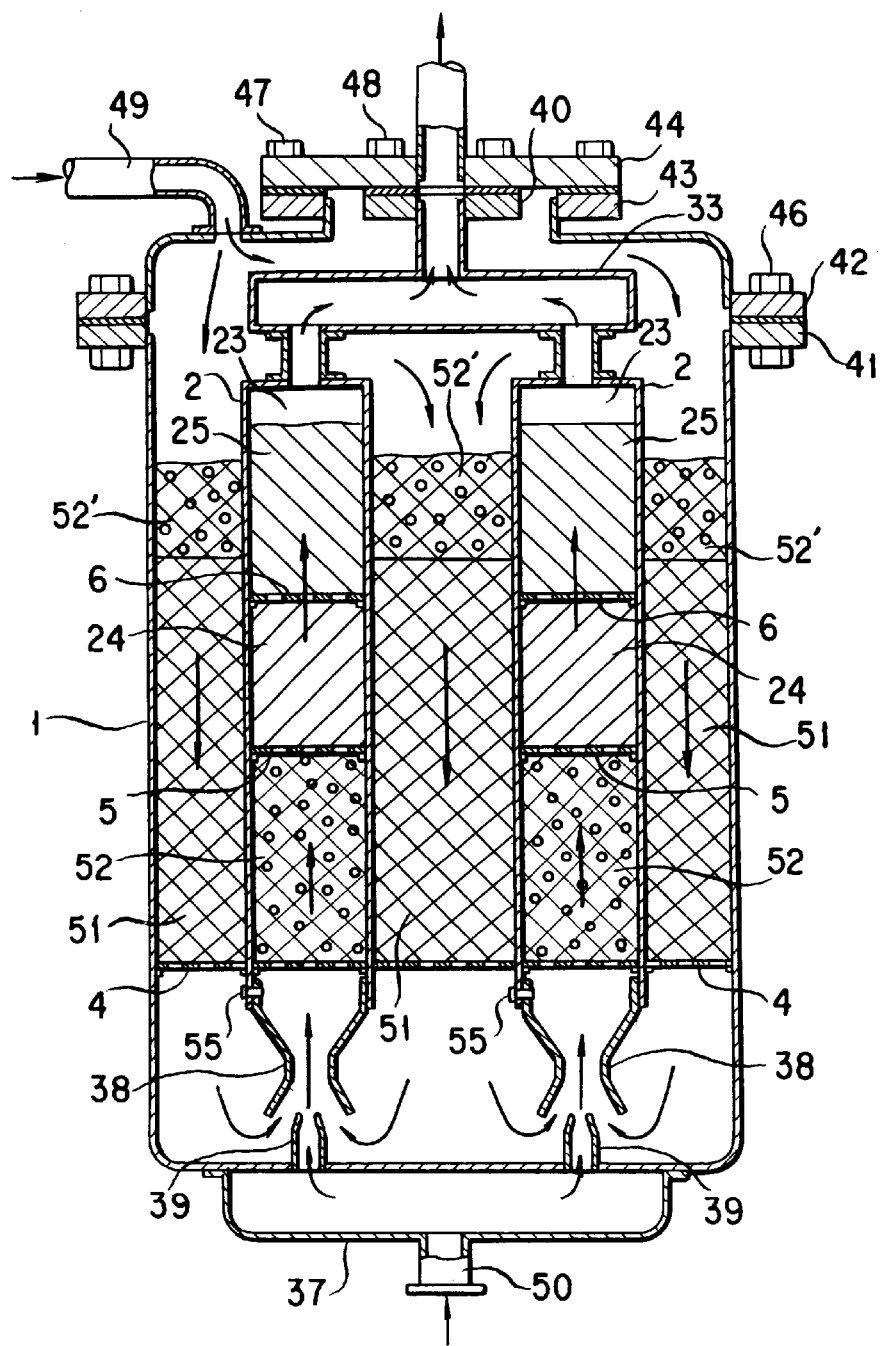
FIG. 5 is a cross sectional view in elevation illustrating a reforming apparatus for use in carrying out a method according to the present invention, and as implemented in a third form of embodiment thereof.

Mention is made of the second form of embodiment of the present invention with reference to FIG. 5. This form of embodiment of the invention is characterized in that a portion of a small amount of oxygen is added in advance to a gaseous mixture of a hydrocarbon or aliphatic alcohol with water vapor coming into contact with reforming catalyst, and the remainder of the small amount of oxygen is added to the gaseous mixture after the gaseous mixture is in part reformed.

Mention is first made of a reforming reactor apparatus for practicing this form of the invention.

The reforming reactor apparatus for use in this form of embodiment is shown in FIG. 5 as one shown in FIGS. 3 and 4 and in part modified. In the modified arrangement, upstreams of the reforming catalyst bed 51 in the space formed between the reforming reactor's outer cylinder 1 and reforming reactor's inner cylinder 2, a region is provided loaded with a refining catalyst and oxidizing catalyst mixture 52' that contains a small amount of an oxidizing catalyst.

In the modified arrangement shown in FIG. 5, a gaseous mixture of a hydrocarbon or an aliphatic alcohol with water vapor having a portion of a small amount of oxygen admixed therewith is brought into contact with the reforming catalyst and oxidizing catalyst mixture 52' and is thereby in part exothermally oxidized and reformed while rising its temperature. The gaseous mixture in part reformed is passed through the reforming reaction catalyst 51 and is thereby further reformed. Thereafter, the mixer 38 acts to admix a remainder of the small amount of oxygen into the further reformed gaseous mixture. Then, the resultant gaseous mixture past the reforming reaction catalyst and oxidizing catalyst mixture 52 raises its temperature to an aimed reaction termination temperature while being reformed by the action of the refining reaction catalyst, thus completing the reforming reaction.

Once the temperature rises occurs in it, the reforming reactor apparatus ceases feeding oxygen for admixing with the gaseous mixture.

The third form of embodiment of the invention described provides largely reducing the time required for starting the operation of the refining reactor apparatus.

With the system so designed as have been described, it is made possible to reduce to minimum the total quantity of heat required for reformation and to reduce to an ultimate limit the amount of oxygen or air required for reformation while obtaining an increased concentration of hydrogen produced.

Although the present invention has been described hereinbefore in terms of the presently preferred forms of embodiments in respect of an auto-oxidation and internal heating type reforming method and apparatus for hydrogen production, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as compassing all alterations, modifications, or alternative applications as fall within the true spirit and scope of the invention.

What is claimed is:

1. An auto-oxidation and internal heating type reforming method for hydrogen production for use in a process which comprises contacting (i) a gaseous mixture of a hydrocarbon or an aliphatic alcohol and water vapor with (ii) a mass of a reforming catalyst to bring about a reforming reaction of the gaseous mixture to produce hydrogen, the method comprising the steps of:

distributively admixing an oxidizing catalyst with said reforming catalyst in said mass, said oxidizing catalyst being in an amount ranging between 1 and 10% of said reforming catalyst; and admixing oxygen with the gaseous mixture of said hydrocarbon or aliphatic alcohol with water vapor, after the gaseous mixture comes into contact with said mass and the gaseous mixture is thereby in part reformed, whereby a portion of said hydrocarbon or aliphatic alcohol is exothermally oxidized to generate an amount of heat required to reform said gaseous mixture of said hydrocarbon or aliphatic alcohol with water vapor.

2. The reforming method as set forth in claim 1, which further comprises the steps of: using a reforming reaction catalyst loaded bed, a reforming reaction catalyst and oxidizing catalyst mixture loaded bed and a shift catalyst loaded bed partitioned by wall surfaces; and transferring heat generated by (i) an oxidation in said reforming reaction catalyst and oxidizing catalyst mixture loaded bed and (ii) a shift reaction in said shift catalyst bed, into said reforming reaction catalyst loaded bed.

3. The reforming method as set forth in claim 1, wherein the reforming reaction is carried out at a pressure of 6 to 8 $kg/cm^2$.

4. The reforming method as set forth in claim 2, wherein the reforming reaction is carried out at a pressure of 6 to 8 $kg/cm^2$.

5. The reforming method as set forth in claim 1, wherein the gaseous mixture includes a hydrocarbon.

6. The reforming method as set forth in claim 5, wherein the reforming reaction is carried out at a space velocity of 1,500 to 8,000.

7. The reforming method of claim 6, wherein the hydrocarbon is selected from the group consisting of methane, ethane, propane, kerosene and gasoline.

8. The reforming method of claim 7, wherein the reforming reaction is carried out at a temperature of 750 to 800° C.

9. The reforming method of claim 8, wherein the proportion of water vapor to hydrocarbon is 2.5 to 3.5.

10. The reforming method of claim 9, wherein the hydrocarbon is methane.

11. The reforming method as set forth in claim 1, wherein the gaseous mixture includes an aliphatic alcohol.

12. The reforming method as set forth in claim 11, wherein the amount of the oxidizing catalyst is 1 to 5% of the reforming catalyst.

13. The reforming method as set forth in claim 11, wherein the aliphatic alcohol is methanol and the amount of the oxidizing catalyst is 1 to 3% of the reforming catalyst.

14. The reforming method as set forth in claim 11, wherein the reforming reaction is carried out at a space velocity of 2,000 to 8,000.

15. The reforming method as set forth in claim 14, wherein the proportion of water vapor to aliphatic alcohol is 2 to 3.

16. The reforming method as set forth in claim 1, wherein the reforming catalyst is selected from the group consisting of $NiS \cdot SiO_2 \cdot Al_2O_3$, $WS_2—SiO_2 \cdot Al_2O_3$ and $NiS—WS_2 \cdot SiO_2 \cdot Al_2O_3$.

17. The reforming method as set forth in claim 16, wherein the oxidizing catalyst is selected from the group consisting of platinum and palladium.

* * * * *